United States Patent
Ishikawa et al.

[11] Patent Number: 5,153,751
[45] Date of Patent: Oct. 6, 1992

[54] HOLOGRAPHIC DISPLAY ELEMENT

[75] Inventors: Tomohisa Ishikawa; Yoshinori Akamatsu, both of Matsusaka; Tsuyoshi Todoriki, Yokosuka, all of Japan

[73] Assignees: Central Glass Company, Limited, Ube; Nissan Motor Co., Ltd., Yokohama, both of Japan

[21] Appl. No.: 692,379

[22] Filed: Apr. 26, 1991

[30] Foreign Application Priority Data

Apr. 27, 1990 [JP] Japan ................... 2-113535
Aug. 31, 1990 [JP] Japan ................... 2-230242

[51] Int. Cl.$^5$ .................... G02B 5/32; G02B 27/10
[52] U.S. Cl. ........................................ 359/13; 359/24
[58] Field of Search .............. 359/13, 14, 24, 15, 359/19, 630

[56] References Cited

U.S. PATENT DOCUMENTS

5,066,525 11/1991 Nakamachi et al. .................. 359/13

FOREIGN PATENT DOCUMENTS

0066496 12/1982 European Pat. Off. .............. 359/13
0419199A2 3/1991 European Pat. Off. .............. 359/13

*Primary Examiner*—Bruce Y. Arnold
*Assistant Examiner*—David R. Parsons
*Attorney, Agent, or Firm*—Fleit, Jacobson, Cohn, Price, Holman & Stern

[57] ABSTRACT

The invention relates to a holographic display element which includes a reflection hologram and is attached to, for example, an automobile windshield so as to project light rays carrying images of display information onto the display element from a luminous source in the car. When external light such as sunlight coming is diffracted by the reflection hologram there is a possibility that visible light ranging from 570 nm (greenish yellow) to 780 nm (red) is diffracted into a certain range of angles in a horizontal plane and makes a strange impression on persons viewing the windshield from the outside. According to the invention another reflection hologram having different diffraction characteristics is superposed on the first hologram on the outer side in order that diffraction of visible light into the aforementioned range of angles may become inconspicuous. In one embodiment the second hologram diffracts light of 570-780 nm at angles outside the aforementioned range of angles thereby to prevent undesirable diffraction by the first hologram. In another embodiment the second hologram diffracts different wavelengths into the range of angles so that additive color mixing with visible light diffracted from the first hologram results in whitening of diffracted light or reduction in the excitation purity of diffracted light as viewed outside the vehicle.

14 Claims, 7 Drawing Sheets

HOLOGRAPHIC DISPLAY ELEMENT

BACKGROUND OF THE INVENTION

This invention relates to a holographic display element which includes a reflection hologram onto which light rays carrying images of display information are to be projected from a luminous image source. The holographic display element is useful, for example, as the combiner of a head-up display system in an automobile or as a display in a building window.

Holographic head-up display systems are already in practical use in aircraft cockpits. Recently efforts have been directed to the development of holographic head-up display systems for automobiles since holographic displays have various merits such as large freedom of layout, highness of wavelength selectivity and possibility of affording lens characteristics.

In most of hitherto developed or proposed head-up display systems for automobiles a reflection hologram formed on a transparent substrate is incorporated in the windshield, and light rays carrying images of display information are projected onto the hologram from a luminous display such as a cathode-ray tube positioned beneath the windshield. The driver or another observer on the vehicle can view the images of display information reflected by the hologram while viewing the forward outside real world through the windshield.

However, there is a problem about diffraction of external light such as sunlight by the hologram in the windshield. As external light such as sunlight is incident on the hologram from the outboard side of the windshield the hologram diffracts the incident light into various wavelengths of light at various angles. When wavelengths in the range from 560 nm (greenish yellow) to 780 nm (red) are diffracted into a certain range of angle with the road surface, the diffracted light is visible to persons viewing the windshield from the outside, such as pedestrians and drivers or passengers on cars running in the opposite direction, as a glaring and uncomfortable color and hence gives them a strange impression.

SUMMARY OF THE INVENTION

It is an object of the present invention to provide a holographic display element of the above described category, which is improved so that the diffraction of external light such as sunlight by the display element may not make a strange or uncomfortable impression on persons viewing the article incorporating the display element from outside the vehicle, i.e. the side opposite to the luminous source for holographic displaying.

According to the invention a holographic display element using a reflection hologram having the above described diffraction characteristics is improved by adding another reflection hologram having different diffraction characteristics. The additional (second) reflection hologram is superposed on the usual (first) reflection hologram on the side opposite to the luminous source for holographic displaying, and the second hologram has such diffraction characteristics that, when collimated external light is incident on the display element from the side opposite to the luminous source and diffracted by the display element, diffraction of light in the visible region of wavelength into a predetermined range of angles in a predetermined plane such as, for example, a horizontal plane becomes inconspicuous to a person viewing the display element from the outside.

More definitely, the present invention provides a holographic display element attached to a transparent plate member for projecting light rays carrying images of display information onto the display element from a luminous image source positioned on a predetermined first side of the display element, the display element comprising a first reflection hologram onto which said light rays are to be projected and a second reflection hologram which is superposed on the first hologram on the side opposite to the first side and is different from the first hologram in diffraction characteristics. The first hologram has such diffraction characteristics that, when collimated external light such as sunlight is incident thereon from the second side opposite to said first side and diffracted, visible light such as light of wavelengths in the range from about 570 nm to about 780 nm is diffracted into a predetermined range of angles in a predetermined horizontal plane.

In a preferred embodiment of the invention, the second reflection hologram has such diffraction characteristics that, when collimated external light is incident on the display element from said second side under such conditions that the first hologram would diffract the external light as visible light of wavelengths in the range from about 570 nm to about 780 nm into the predetermined range of angles if the second hologram were absent, the second hologram diffracts visible light of wavelengths in the 570–780 nm range at angles outside the predetermined range of angle and diffracts light of wavelengths shorter than about 570 nm into that range of angles.

In another preferred embodiment of the invention the second reflection hologram has such diffraction characteristics that, when external light is incident on the display element from said second side under such conditions that the first hologram diffracts the external light as visible light into the predetermined range of angles, the second hologram diffracts visible light of different wavelengths into the predetermined range of angles so as to reduce excitation purity of color appearing in the predetermined range of angles by additive color mixing of light diffracted by the first and second holograms.

In the present invention each of the first and second reflection holograms is usually a hologram sheet essentially consisting of a transparent substrate and a record layer in which a pattern of interference fringes is formed. In either of the above stated first and second embodiments the second reflection hologram may be placed directly on the first reflection hologram or superposed on the first hologram with interposition of at least one transparent film between the two holograms.

In the above stated second embodiment it is also possible to integrate the first and second reflection holograms into a single hologram sheet by forming a pattern of interference fringes and another pattern of interference fringes in a single record layer by a multiple exposure process.

A holographic display element according to the invention can be incorporated in an automobile windshield as the combiner of a head-up display system. In that case the incidence of external light such as sunlight on the display element from the outside does not result in diffraction of glaringly visible light of wavelengths of 570–780 nm within the range, for example, from 0 to 40 degrees or from 0 to 60 degrees with a horizontal plane or road surface, so that the diffracted light does not give a strange or uncomfortable impression to persons viewing the windshield from the outside. The performance of the display element is not adversely affected by the addition of the second reflection hologram.

It is also possible to use a holographic display element according to the invention in a building window or a partition. In such a case the aforementioned predetermined range of angles may suitably be set with respect to a plane normal to the window or partition at the level of the display element.

DESCRIPTION OF THE PREFERRED EMBODIMENTS

Figure 1:
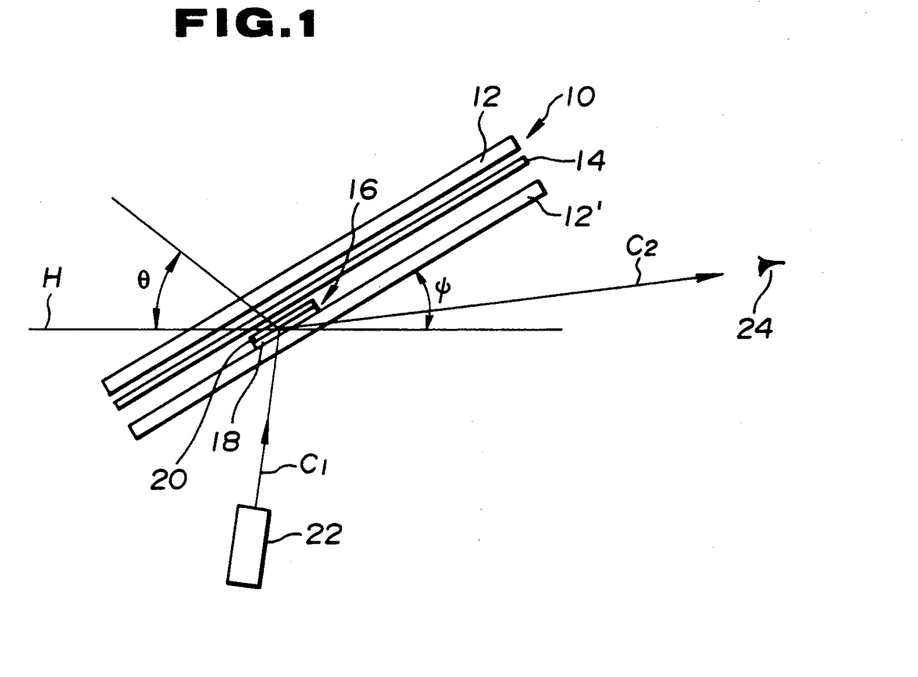
FIG. 1 shows, in an explanatorily exploded sectional view, an automobile windshield which incorporates a holographic display element according to the invention as a combiner of a head-up display.

FIG. 1 shows an automobile windshield 10 which incorporates a holographic display element 16 according to the invention as a combiner of a head-up display system. The windshield 10 uses a laminated glass made up of two glass plates 12 and 12' and a transparent plastic interlayer 14 such as a polyvinyl butyral film. The holographic display element 16 consists of a first reflection hologram 18 in sheet form and a second reflection hologram 20 in sheet form which is superposed on the first hologram sheet 18. The element 16 is confined in the laminated glass such that the first hologram 18 is in contact with the glass plate 12' on the inboard side, whereby the second hologram 20 faces the glass plate 12 on the outboard side through the transparent interlayer 14. The first and second reflection holograms 18 and 20 are different in diffraction characteristics as will be described hereinafter. The first reflection hologram 18 serves as the principal part of the combiner, and the second reflection hologram 20 serves an auxiliary purpose. The windshield 10 including the holographic display element 16 makes an angle $\psi$ with a horizontal plane H.

In the head-up display system a light emitting display 22 such as a cathode-ray tube is the source of an image of information pertaining to the operational status of the vehicle such as, for example, vehicle speed and engine RPM. From the display 22 information-carrying light rays of a given wavelength are projected onto the first reflection hologram 18 as represented by arrow $C_1$ in FIG. 1, and the light rays are diffracted by the reflection hologram 18 at a given angle so that an image of the information is presented to the eyes 24 of the driver, as represented by arrow $C_2$, while the driver is viewing the external real world scene through the combiner 16 in the windshield 10.

Figure 2:
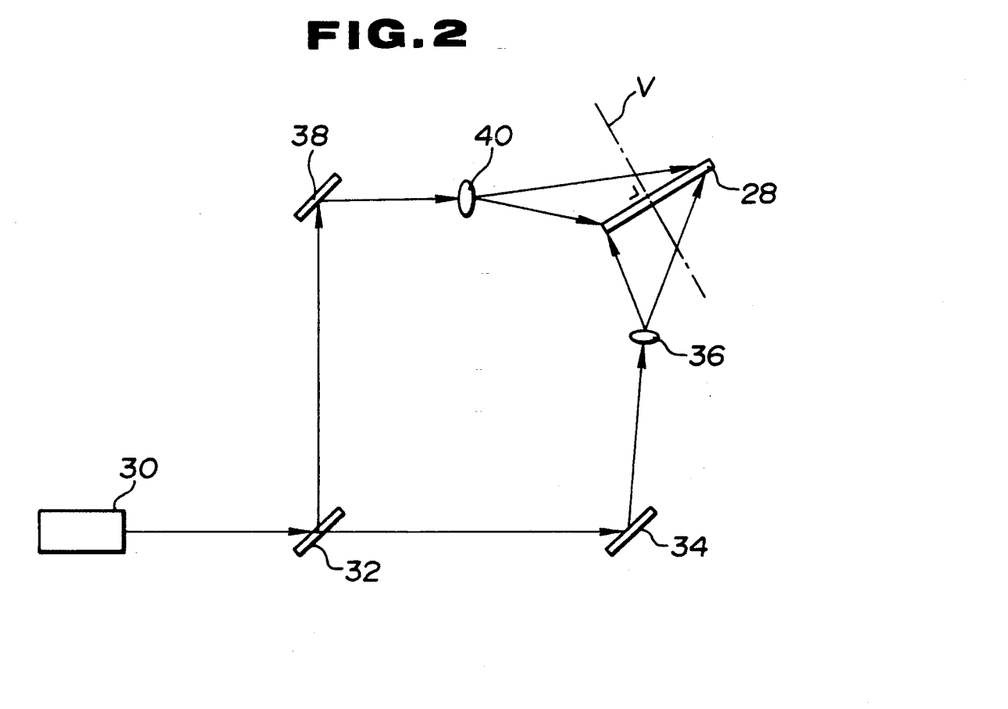
FIG. 2 is a diagrammatic illustration of an optical system used in producing a reflection hologram sheet for use in the present invention.

Referring to FIG. 2, the first and second reflection hologram sheets 18 and 20 are each produced in the following way.

In FIG. 2 numeral 28 indicates an optically transparent polyester film used as the base of the hologram sheet 18 or 20. In advance a photosensitive material is coated on the polyester film 28 and dried. Usually dichromated gelatin is used as the photosensitive material, but it is also possible to use a different material such as a silver halide base composition, a photosensitive polymer or a photoresist. For exposure of the photosensitive coating layer on the film 28 to light, a laser beam emitted from a suitable laser oscillator 30 such as an argon gas laser oscillator is divided into two beams by a beam splitter 32. One of the divided beams is directed to a convex lens 36 by a reflective mirror 34. Through the lens 36 the laser beam diverges into a spherical wave, which illuminates the photosensitive coating layer on the film 28. The other beam is directed to another convex lens 40 by a reflective mirror 38 to diverge into a spherical wave, which illuminates the photosensitive coating layer from the opposite side. After that the photosensitive layer on the film 28 is subjected to usual developing and fixing treatments. By this process fine interference fringes are created in the photosensitive layer on the film 28, and the processed film 28 can be used as a reflection hologram sheet.

In the above described exposure operation for producing the first reflection hologram 18 in FIG. 1, the wavelength of the laser beam (type of the laser oscillator 30) and the angle of incidence of the laser beam on each side of the film 28 (angle of the axis of the lens 36 or 40 with the normal V to the film 28) are determined by using the Bragg's equation with consideration of the holographic reconstruction conditions (wavelength of the light source 22 and angular positions of the light source 22 and the driver's eyes 24) and the amount of a change in the thickness of the photosensitive layer on the film 28 during the hologram producing process. In producing the second reflection hologram 20 the exposure conditions are determined such that the second reflection hologram 20 in FIG. 1 diffracts external light of wavelengths ranging from 570 to 780 nm at angles outside a predetermined range of angles ($\theta$) with the horizontal plane H.

EXAMPLE 1

This is an example of the holographic combiner 16 shown in FIG. 1. The display or light source 22 for holographic reconstruction emits green light of 545 nm wavelength, and the light source 30 for producing the first and second reflection holograms 18, 20 is an argon gas laser oscillator which emits light of 488 nm wavelength. In the exposure operation for producing the first reflection hologram 18 the angle of incidence through the convex lens 36 was 22.5 degrees, and the angle of incidence through the convex lens 40 was 38 degrees.

Figure 3:
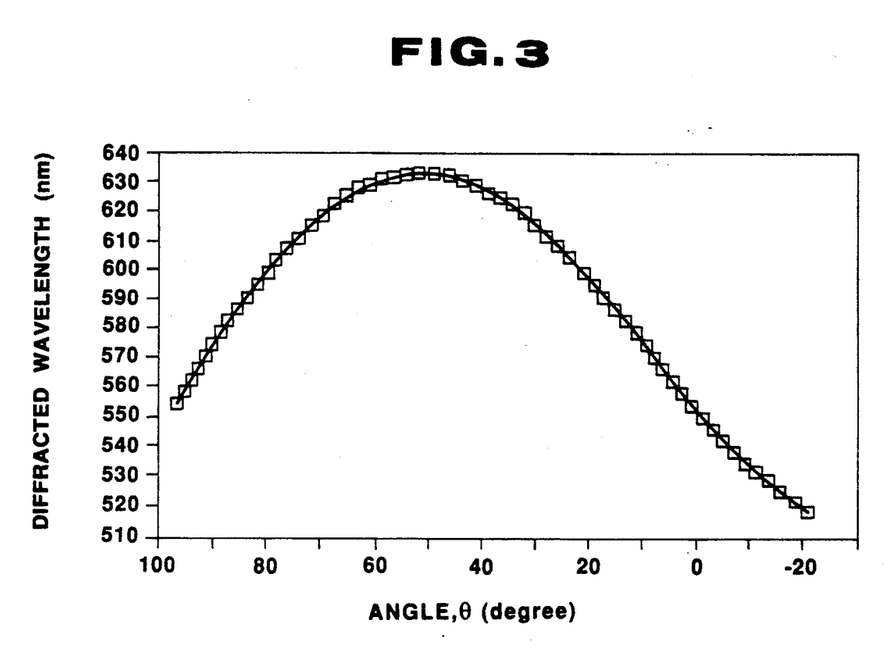
FIGS. 3 and 4 show, with respect to an example of the display element in FIG. 1, diffraction characteristics of the first and second reflection holograms in the display element, respectively.

When the obtained first reflection hologram 18 was oriented as shown in FIG. 1 without superposing the second reflection hologram 20, the hologram 18 diffracted sunlight coming from the outside (opposite to the light source 22 for holographic reconstruction) with the characteristic shown in FIG. 3. That is, within the range of angle $\theta$ from 0 to 40 degress the diffracted light contained wavelengths ranging from 570 nm (greenish yellow) to 630 nm (reddish orange). Light of such wavelengths make a strange impression on pedestrians or persons in oncoming cars.

Figure 4:
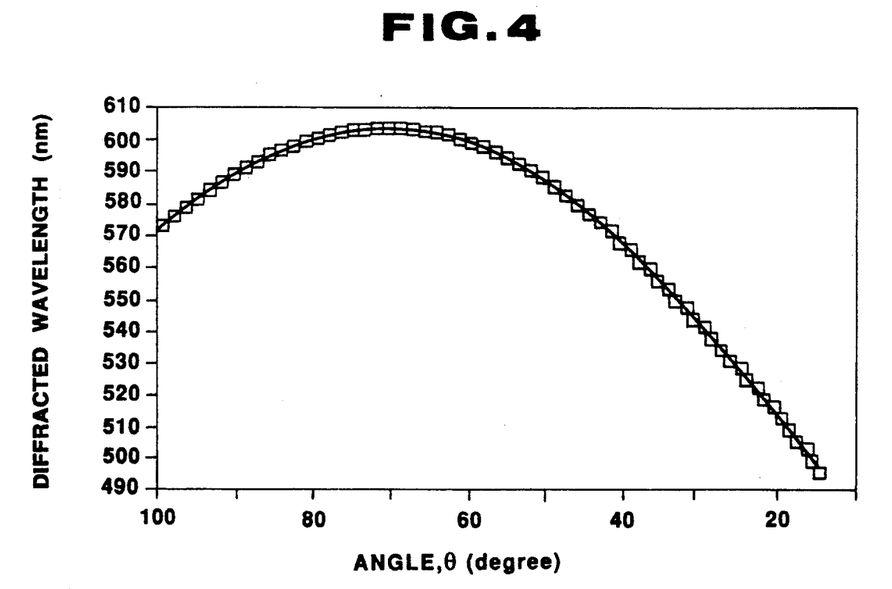

The chart of FIG. 3 shows that the first reflection hologram 18 diffracts external light of 600 nm wavelength at an angle of 20 degrees with the horizontal plane H (i.e. the middle of the 0 to 40 degrees range of angle $\theta$). In producing the second reflection hologram 20 the angle of incidence of external light of this wavelength was determined by the Bragg's equation, and the exposure conditions (angles of incidence) were determined so as to diffract light of this wavelength in a direction outside the 0 to 40 degree range of angles, for example at an angle of 60 degrees with the horizontal plane H. That is, the angle of incidence through the convex lens 36 was 25 degrees, and the angle of incidence through the convex lens 40 was 8 degrees. When the obtained second reflection hologram 20 was oriented as shown in FIG. 1, the hologram 20 diffracted sunlight coming from the outside with the characteristic shown in FIG. 4. It is seen that light of wavelengths longer than 570 nm was diffracted at angles greater than 40 degrees with the horizontal plane.

Figure 5:
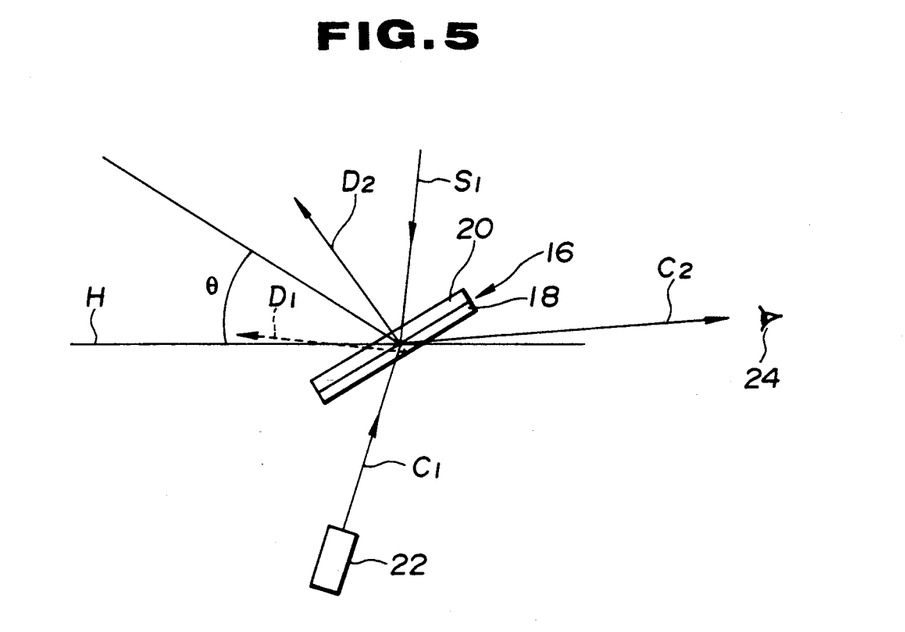
FIG. 5 illustrates the diffractive and reconstructive functions of the holographic display element in FIG. 1.

The second reflection hologram 20 was superposed on the first reflection hologram 18 to complete the combiner 16 in the windshield 10 in FIG. 1. Referring to FIG. 5, in this case the second reflection hologram 20 diffracted the incident light $S_1$ such that wavelengths longer than 570 nm were diffracted, as represented by arrow $D_2$, at angles outside the predetermined range (0–40 degrees) of angle $\theta$ with the horizontal plane H. That is, the second hologram 20 prevented the first hologram 18 from diffracting light of 570–630 nm at angles of 0–40 degrees with the horizontal plane. As will be understood from FIG. 4 the second hologram 20 diffracted light of wavelengths ranging from 570 nm (greenish yellow) to 475 nm (blue) at angles of 0–40 degrees with the horizontal plane, so that the diffracted light was not conspicuous and did not give a strange impression. A fraction of the incident light of 570–780 nm passes through the second hologram 20 and is diffracted by the first hologram 18 at angles in the 0–40 degree range, as represented by arrow $D_1$ in FIG. 5, but the diffracted light $D_1$ is neglibile when the diffraction efficiency of the second hologram 20 is made sufficiently high, e.g. 95% or above.

While external daylight was diffracted in the above described manner, the information-carrying light $C_1$ of 545 nm (green) was mostly diffracted by the first reflection hologram 18 toward the eyes 24 of the driver so that an image of the display information was clearly visible to the driver.

EXAMPLE 2

This is another example of the combiner 16 shown in FIG. 1. The display or light source 22 for holographic reconstruction emits red light of 610 nm wavelength, and the light source 30 for producing the first and second reflection holograms 18, 20 is an argon gas laser oscillator which emits light of 514.5 nm wavelength. In the exposure operation for producing the first reflection hologram 18 the angle of incidence through the convex lens 36 was 38.5 degrees, and the angle of incidence through the convex lens 40 was 58 degrees.

Figure 6:
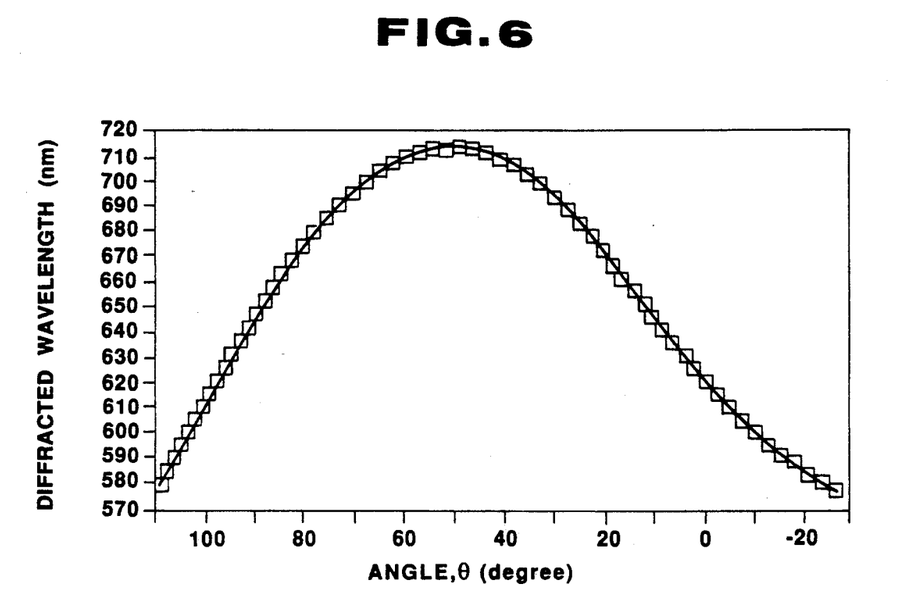
FIGS. 6 and 7 show, with respect to another example of the display element in FIG. 1, diffraction characteristics of the first and second holograms, respectively.

When the obtained first reflection hologram 18 was oriented as shown in FIG. 1 without superposing the second reflection hologram 20, the hologram 18 diffracted sunlight coming from the outside with the characteristic shown in FIG. 6. That is, within the range of angle $\theta$ from 0 to 40 degrees, the diffracted light contained wavelengths ranging from 620 nm to 710 nm (red).

In producing the second reflection hologram 20 the angle of incidence through the convex lens 36 was 52 degrees, and the angle of incidence through the convex lens 40 was 23.5 degrees. When the obtained second reflection hologram 20 was oriented as shown in FIG. 1, the hologram 20 diffracted sunlight coming from the outside with the characteristic shown in FIG. 7. It is seen that light of wavelengths longer than 620 nm was diffracted at angles greater than 40 degrees with the horizontal plane.

Figure 7:
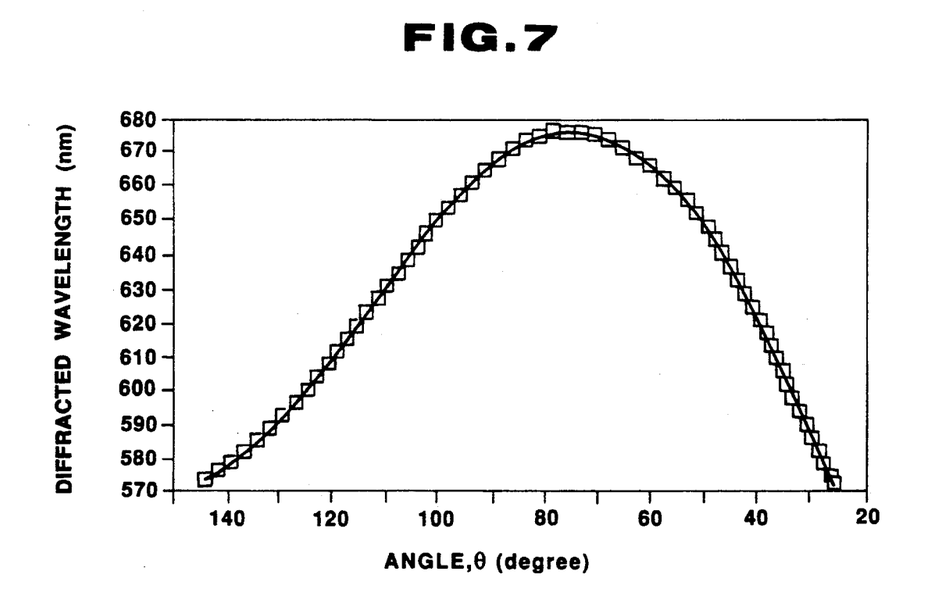

The second hologram 20 was superposed on the first hologram 18 to complete the combiner 16 in the windshield 10 in FIG. 1. In this case external light incident on the combiner 16 was diffracted by the second hologram 20 such that light of wavelengths longer than 620 nm was diffracted at angles greater than 40 degrees with the horizontal plane. Therefore, in the 0–40 degree range of angle $\theta$, the diffracted light did not give a strange or uncomfortable impression to persons outside the car. FIG. 7 shows that the second hologram 20 of this example diffracts light of wavelengths ranging from 570 nm (yellowish green) to 620 nm (red) at angles of 25–40 degrees with the horizontal plane, but actually this offers little problem because the diffraction of concern occurs only when the angle of incidence of daylight is greater than 110 degrees in terms of angle with the horizontal plane. However, according to the angle $\psi$ of the windshield 10 there is a possibility that uncomfortable colors of the diffracted light become visible to persons outside the car. In such a case the problem is solved by superposing another reflection hologram, which is identical with the second reflection hologram produced in Example 1, on the second hologram 20 in Example 2.

The information-carrying light $C_1$ of 610 nm (red) was mostly diffracted by the first reflection hologram 18 toward the eyes 24 of the driver as represented by arrow $C_2$ so that an image of the display information was clearly visible to the driver.

In the foregoing examples the first and second holograms 18 and 20 were in direct contact with each other, but this is not essential. Alternatively, the plastic interlayer 14 in FIG. 1 may be interposed between the first and second holograms 18 and 20 by attaching the first hologram 18 to the inside surface of the glass plate 12' on the inboard side and the second hologram 20 to the inside surface of the glass plate 12 on the outboard side.

In general a hologram sheet is liable to deteriorate by absorption of moisture. Therefore, it is rather desirable to cover each side of the laminated holographic display element 16 with a transparent protective film or the like. In this regard, it is favorable to modify the laminated glass of the windshield in FIG. 1 by additionally using another plastic interlayer such that the laminated element 16 (18+20) is sandwiched between the illustrated interlayer 14 and the additional interlayer. Besides, the holographic display element 16 can be attached to a single unlaminated) glass plate on condition that the outer surface of the display element 16 is covered with a transparent protective film.

Figure 8:
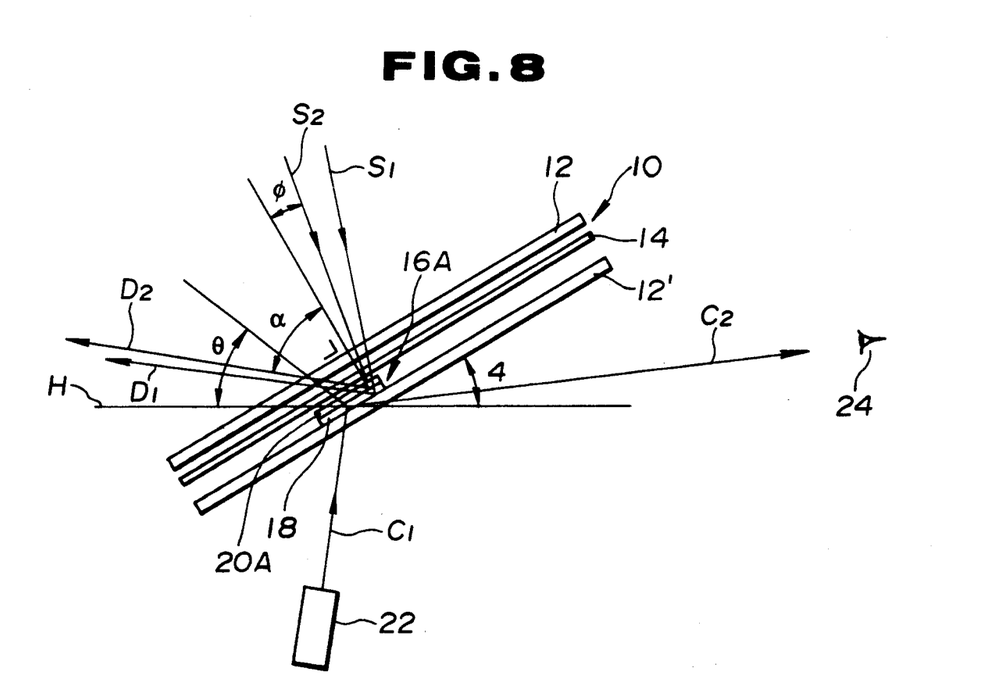
FIG. 8 illustrates, in a view similar to FIG. 1, the diffractive and reconstructive functions of another holographic display element according to the invention which is incorporated in an automobile windshield as a combiner of a head-up display.

FIG. 8 illustrates an embodiment of another aspect of the present invention. More particularly, FIG. 8 shows an automobile windshield 10 which incorporates a holographic display element 16A according to the invention as a combiner of a head-up display system. The windshield 10 uses a laminated glass which was already described with reference to FIG. 1. The holographic display element 16A consists of a first reflection hologram 18 in sheet form and a second reflection hologram 20A in sheet form which is superposed on the first hologram sheet 18, and the element 16 is confined in the laminated glass such that the first hologram 18 is in contact with the glass plate 12' on the inboard side, whereby the second hologram 20A faces the glass plate 12 on the outboard side through the transparent interlayer 14. The windshield 10 including the display element 16 makes an angle $\psi$ with a horizontal plane H. The first reflection hologram 18 serves as the principal part of the combiner 16 and does not differ from the counterpart in FIG. 1. The head-up display system includes a light emitting display 22 such as a cathode-ray tube and operates in the manner already described with reference to FIG. 1.

When external light such as sunlight is incident on the holographic combiner 16 from the outside, as represented by arrow $S_1$, the first reflection hologram 18 diffracts the incident light. Within a predetermined range of angle $\theta$ with the horizontal plane H the diffracted light (arrow $D_1$) will include wavelengths ranging from 560 nm (yellowish green) to 780 nm (red) which offer discomfort to persons viewing the windshield 10 from the outside. The second reflection hologram 20A serves the purpose of reducing the exciting purity of the light diffracted by the first hologram 18 within the aforementioned range of angle $\theta$. More particularly, the second hologram 20A diffracts complementary colors to the yellowish green to red colors diffracted by the first hologram 18 within the aforementioned range of angle.

The second reflection hologram 20A can be produced by using the exposure method already described with reference to FIG. 2.

EXAMPLE 3

This is an example of the combiner 16A shown in FIG. 8. The angle $\psi$ of the windshield 10 is 30 degrees. The display or light source 22 for holographic reconstruction emits green light of 545 nm wavelength, and the light source 30 for producing the first reflection hologram 18 is an argon gas laser oscillator which emits light of 514.5 nm wavelength. In the exposure operation for producing the first reflection hologram 18 the angle of incidence through the convex lens 36 was 10.0 degrees, and the angle of incidence through the convex lens 40 was 25.0 degrees.

Figure 9:
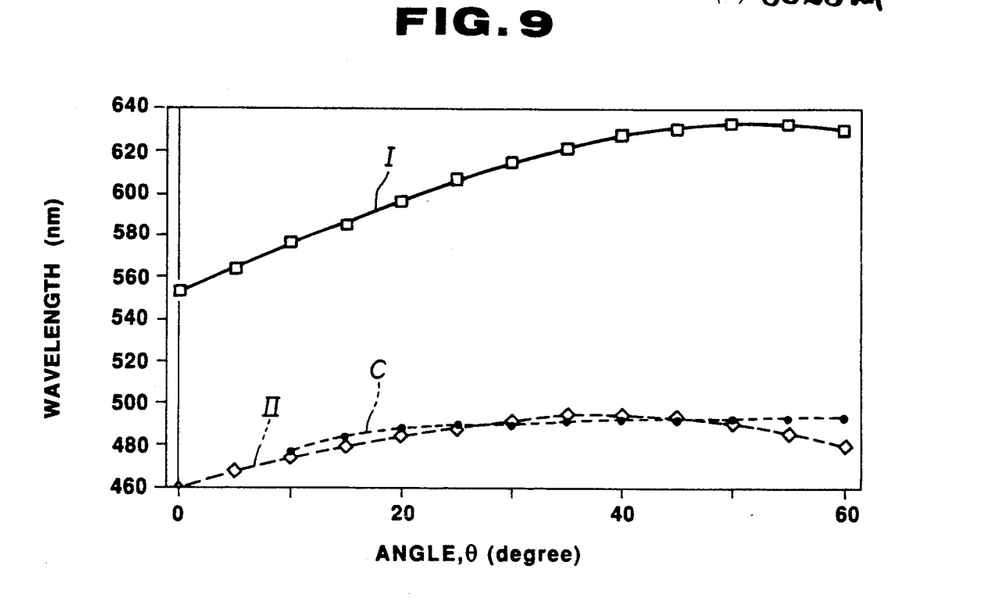
FIG. 9 shows, with respect to an example of the display element in FIG. 8, diffraction characteristics of the first and second reflection holograms in the display element.

When the obtained first reflection hologram 18 was oriented as shown in FIG. 8 the hologram 18 diffracted sunlight coming from the outside with the characteristic represented by curve I in FIG. 9. That is, within the range of angles $\theta$ from 0 to 60 degrees, the diffracted light ($D_1$) contained wavelengths ranging from 550 nm (yellowish green) to 630 nm (red).

Figure 11:
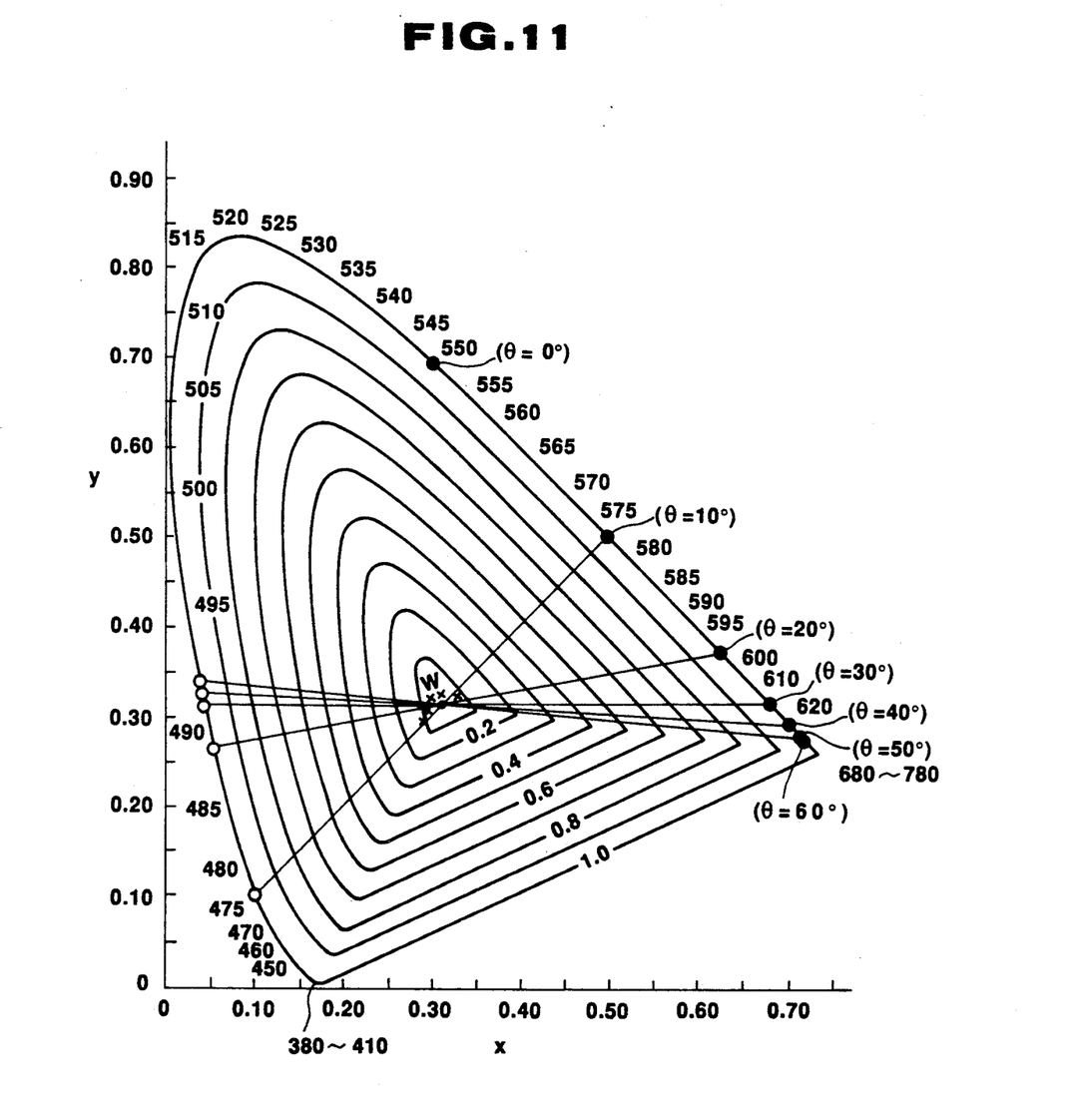
FIG. 11 is a standard chromaticity diagram.

To described every color by numerical values the most widely used system of colorimetry is the XYZ colorimetric system of CIE (Commission Internationale de l'Eclairage). For quantitative description of any part of the visible spectrum this colorimetric system uses tristimulus values, viz. a stimulus value X, a stimulus value Y and a stimulus value Z. Assuming that $X+Y+Z=S$ (constant), the chromaticity of the wavelength in question is determined by chromaticity coordinates x ($x=X/S$) and y ($y=Y/S$). FIG. 11 is the CIE chromaticity diagram. Using this diagram any color can be identified as a point within the region enclosed by the spectral locus (the curve marked with wavelength values) and the locus of pure purples (the straight line joining the ends of the spectral locus). On the diagram the point W is the white point (standard light source, $D_{65}$:x=0.3127, y=0.3290). The white point W can be taken as the point of zero purity of color excitation, and maximum excitation purity can be found at all points on the spectral locus and on the locus of pure purples. The excitation purity of any one point on the diagram is given by the ratio of the distance from that point to the white point W to the length of a straight line drawn from W through the point in question to the spectral locus or the locus of pure purples.

In FIG. 11, the chromaticity points indicated by black circle marks are representatives of uncomfortable colors which appear within the 0–60 degrees range of angle $\theta$ by diffraction by the first reflection hologram 18 of Example 3. If a straight line drawn from any one point indicated by a black circle mark through the white point W intersects the spectral locus on the opposite side, the point of intersection (indicated by a white circle mark) is approximately the complementary color to the color indicated by the black circle mark.

In FIG. 9 the curve C represents an ideal diffraction characteristic to provide a complementary color to any one of the uncomfortable colors diffracted by the first reflection hologram 18 of Example 3. It is desirable that the second reflection hologram 20A has the diffraction characteristic represented by the curve C, but actually it is difficult to fully meet this desire. To approximate the desirable diffraction characteristic the exposure conditions for producing the second hologram 20A were determined in the following way.

In this case the predetermined range of angle $\theta$ is from 0° to 60°. Referring to FIG. 8, with respect to the second hologram 20A the angle of incidence of external light ($S_2$) is assumed to be $\phi$, and the angle of diffraction (indicated by arrow $D_2$) to be $\alpha$. At an angle close to $(\phi+\alpha)/2$ the dependence of diffracted wavelength on angle becomes small (decrease of a change in wavelength with a change in diffraction angle), and at that angle the wavelength of diffracted light becomes maximal. Therefore, it is suitable to adjust the angle of incidence $\phi$ and the angle of diffraction $\alpha$ such that the direction of diffracted light given by angle $(\phi+\alpha)/2$ approximately coincides with $\frac{1}{2}$ of the predetermined range of angle $\theta$, viz. at an angle of $(60°-0°)/2$ $(=30°)$ with the horizontal plane H. That is, the conditions of exposure operation for producing the second reflection hologram 20A are determined such that $\phi$ and $\alpha$ satisfy the following equation:

$$(\phi+\alpha)/2 = 90° - \psi(30°) - 30° = 30°$$

Further, the exposure conditions are determined so as to make the angle ($\phi+\alpha$) as small as possible since the dependence of diffracted wavelength on angle reduces as the angle ($\phi+\alpha$) becomes smaller. In determining the exposure conditions it is also taken into consideration that a suitable range of the angle of incidence $\phi$ of external light ($S_2$) is from $+30°$ (on the upside of the normal to the element 16A: angle of 90° with the horizontal plane) to $-10°$ (downside of the normal to the element 16A: angle of 50° with the horizontal plane) because outside this range the quantity of incident light is relatively small.

In producing the second reflection hologram 20A by using the optical system of FIG. 2, the light source 30 was an argon gas laser oscillator which emits light of 488.0 nm wavelength. In the exposure operation the angle of incidence through the lens 36 was 45.5 degrees, and the angle of incidence through the lens 40 was 0.0 degree.

When the obtained second hologram 20A was oriented as shown in FIG. 8 the hologram 20A diffracted external light ($S_2$) with the characteristic represented by curve II in FIG. 9. That is, the diffraction characteristic of the second hologram 20A was successfully approximated to the ideal characteristic represented by curve C. Table 1 shows excerpts of the data shown in FIG. 9.

TABLE 1

| Angle $\theta$ | Wavelength diffracted by the 1st hologram 18 (nm) | Wavelength of Complementary Color (nm) | Wavelength diffracted by the 2nd hologram 20A (nm) |
| --- | --- | --- | --- |
| 0° | 554 | —*) | 461 |
| 10° | 577 | 478 | 474 |
| 20° | 598 | 489 | 485 |
| 30° | 616 | 492 | 493 |
| 40° | 629 | 493 | 495 |
| 50° | 634 | 493 | 491 |
| 60° | 630 | 493 | 480 |

*)No complementary color exists

The second hologram 20A was superposed on the first hologram 18 to complete the combiner 16A in the windshield 10 of FIG. 8. In the 0 to 60 degrees range of angle $\theta$, additive color mixing of diffracted light $D_1$ attributed to the first reflection hologram 18 with diffracted light $D_2$ attributed to the second reflection hologram 20A resulted in whitening of diffracted light or approximating of excitation purities to 0 (zero) as represented by cross marks on the diagram of FIG. 11. Accordingly the diffracted light ($D_1$, $D_2$) did not offer discomfort to persons viewing the windshield 10 from the outside.

The information-carrying light $C_1$ of 545 nm (green) was mostly diffracted by the first hologram 18 toward the eyes 24 of the driver as represented by arrow $C_2$ so that an image of the display information was clearly visible to the driver.

EXAMPLE 4

This is another example of the combiner 16A shown in FIG. 8. In this case the display 22 emits red light of 610 nm wavelength.

Figure 10:
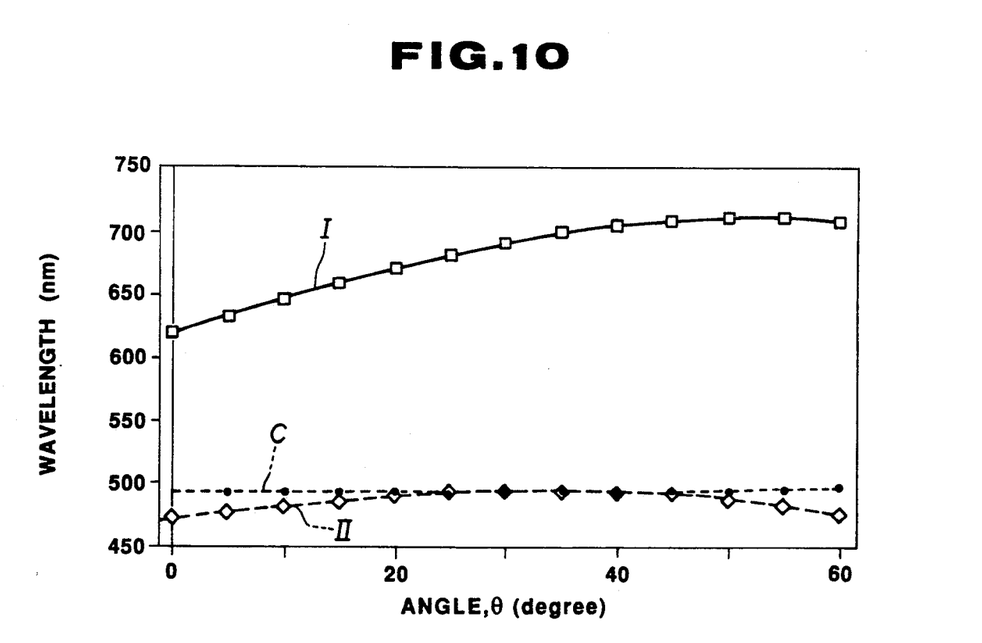
FIG. 10 shows, with respect to another example of the display element in FIG. 8, diffraction characteristics of the first and second holograms.

For producing the first hologram 18 the light source 30 was an argon gas laser oscillator which emits light of 514.5 nm. In the exposure operation of the angle of incidence through the lens 36 was 37.5 degrees, and the angle of incidence through the lens 40 was 56.5 degrees. When the obtained first hologram 18 was oriented as shown in FIG. 8 the diffraction characteristic of the hologram 18 for external light ($S_1$) was as represented by curve I in FIG. 10. In FIG. 10, curve C represents an ideal diffraction characteristic to provide a complementary color to any one of the uncomfortable colors diffracted by the first hologram 18 of Example 4.

For producing the second hologram 20A the light source 30 was an argon gas laser oscillator which emits light of 488.0 nm. In the exposure operation the angle of incidence through the lens 36 was 53.5 degrees, and the angle of incidence through the lens 40 was $-4.5$ degrees. (The negative sign means that the convex lens 40 was positioned on the right-hand side of the central normal V in FIG. 8.) When the obtained second hologram 20A was oriented as shown in FIG. 8 the diffraction characteristic of the hologram 20A for external light ($S_2$) was as represented by curve II in FIG. 10. That is, the diffraction characteristic of the second hologram 20A was successfully approximated to the ideal characteristic represented by the curve C. Table 2 shows excerpts of the data shown in FIG. 10.

TABLE 2

| Angle $\theta$ | Wavelength diffracted by the 1st hologram 18 (nm) | Wavelength of Complementary Color (nm) | Wavelength diffracted by the 2nd hologram 20A (nm) |
| --- | --- | --- | --- |
| 0° | 621 | 492 | 473 |
| 10° | 648 | 494 | 483 |
| 20° | 673 | 494 | 492 |
| 30° | 694 | 494 | 496 |
| 40° | 708 | 494 | 495 |
| 50° | 714 | 494 | 488 |
| 60° | 710 | 494 | 474 |

The second hologram 20A was superposed on the first hologram 18 to complete the combiner 16A in the windshield 10 of FIG. 8. Also in this example additive color mixing of diffracted light occurred in the 0 to 60 degrees range of angle $\theta$, and the effect of color mixing was as described in Example 3. The information-carrying light of 610 nm (reddish orange) was mostly diffracted by the first hologram 18 toward the eyes 24 of the driver so that an image of the display information was clearly visible to the driver.

EXAMPLE 5

In this example the first and second reflection holograms 18 and 20A of Example 3 were integrated into a single hologram sheet by using a multiple exposure method.

Figure 12:
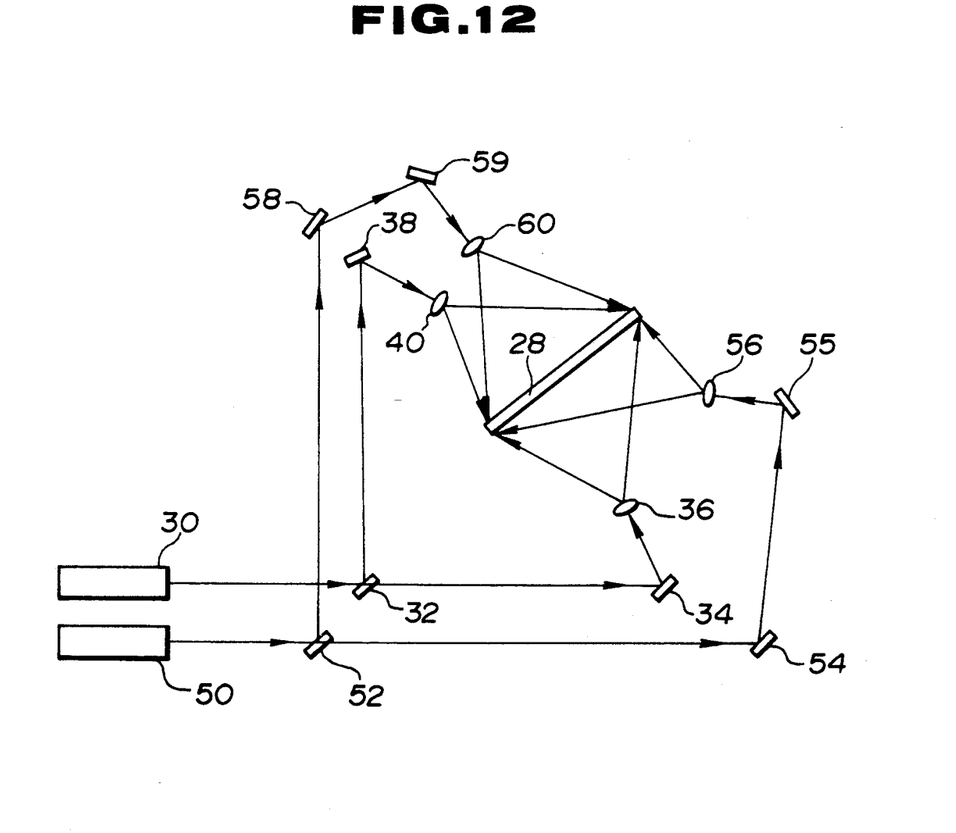
FIG. 12 is a diagrammatic illustration of an optical system used to integrate the first and second holograms in the display element in FIG. 8 into a single hologram sheet by a multiple exposure method.

FIG. 12 shows an optical system used for the multiple exposure method. This optical system is a combination of two sets of optical systems each of which is fundamentally similar to the system of FIG. 2. There are two laser oscillators 30 and 50. The laser beam from the first laser 30 is divided into two beams by a beam splitter 32. One of the divided beams is directed to a convex lens 36 by a reflective mirror 34, and through the lens 36 the laser beam diverges into a spherical wave which illuminates the photosensitive layer on a hologram sheet base 28 such as a polyester film. The other beam is directed to a convex lens 40 by a reflective mirror 38, and through the lens 40 the laser beam diverges into a spherical wave which illuminates the photosensitive layer on the film 28 from the opposite side. The laser beam from the second laser 50 is divided into two beams by a beam splitter 52. By reflective mirrors 54 and 55 one of the divided beams is directed to a convex lens 56 which was on the same side of the film 28 as the lens 36, and through the lens 56 the laser beam diverges into a spherical wave which illuminates the photosensitive layer on the film 28. The other beam is directed to a convex lens 60 on the opposite side by refractive mirrors 58 and 59, and through the lens 60 the laser beam diverges into a spherical wave which illuminates the photosensitive layer. After the multiple exposure operation the photosentive layer on the film 28 is subjected to usual developing and fixing treatments.

In Example 5 the first laser 30 was an argon gas laser which emits light of 488.0 nm wave-length, and the second laser 50 was an argon gas laser which emits light of 514.5 nm wavelength. With respect to light emitted from the first laser 30 the angle of incidence through the lens 36 (angle of the lens axis with normal to the film 28) was 10.0 degrees, and the angle of incidence through the lens 40 was 25.0 degrees. With respect to light emitted from the second layer 50 the angle of incidence through the lens 56 was 45.5 degrees, and the angle of incidence through the lens 60 was 0.0 degree. As shown in this example, for the multiple exposure operation it is preferable to use two laser oscillators different in oscillation wavelength thereby to prevent formation of unwanted hologram (array of interference fringes) other than the aimed first and second holograms.

The hologram sheet produced by the above multiple exposure method proved to be functionally identical with the display element 16A of Example 3 constructed of the first hologram sheet 18 and the second hologram sheet 20A.

In Examples 3 to 5 the second reflection hologram 20A was afforded with such diffraction characteristics that the additive color mixing of the light diffracted by the first hologram and the light diffracted by the second hologram results in whitening of the color mixture. However, it is an option to modify the characteristic of the second hologram so as to produce an arbitrary pale color by the additive color mixing effect on condition that the excitation purity of the produced color is not higher than about 0.4.

What is claimed is:

1. A holographic display element attached to a transparent plate member for projecting light rays carrying images of display information onto the display element from a luminous image source positioned on a predetermined first side of the display element, the display element comprising:

a first reflection hologram onto which said light rays are to be projected, the first reflection hologram having such diffraction characteristics that, when collimated external light is incident thereon from a second side opposite to said first side and diffracted, light in the visible region of wavelengths is diffracted into a predetermined range of angles in a predetermined plane; and a second reflection hologram which is superposed on said first reflection hologram on said second side, the second reflection hologram being different from said first reflection hologram in diffraction characteristics such that, when collimated external light is incident on the display element from said second side and diffracted by the display element, diffraction of light in the visible region of wavelengths into said predetermined range of angles is inconspicuous to a person viewing the display element from said second side.

2. A holograhic display element according to claim 1, wherein said plate member is an automobile windshield, said predetermined plane being a horizontal plane and said predetermined range of angles comprising the range from 0 to 40 degrees.

3. A holographic display element attached to a transparent plate member for projecting light rays carrying images of display information onto the display element from a luminous image source positioned on a predetermined first side of the display element, the display element comprising:

a first reflection hologram onto which said light rays are to be projected, the first reflection hologram having such diffraction characteristics that, when external light is incident thereon from a second side opposite to said first side and diffracted, visible light of wavelengths in the range from about 570 nm to about 780 nm is diffracted into a predetermined range of angles in a predetermined plane; and a second reflection hologram which is superposed on said first reflection hologram on said second side, the second reflection hologram being different from said first reflection hologram in diffraction characteristics such that, when collimated external light is incident on the display element from said second side under such conditions that said first reflection hologram will diffract the external light as visible light of wavelengths in the range from about 570 nm to about 780 nm into said predetermined range of angles if the second reflection hologram is absent, the second reflection hologram diffracts visible light of wavelengths in said range at angles outside said predetermined range of angles and diffracts light of wavelengths shorter than about 570 nm into said range of angles.

4. A holographic display element according to claim 3, wherein said second reflection hologram is placed directly on said first reflection hologram.

5. A holographic display element according to claim 3, wherein said second reflection hologram is superposed on said first reflection hologram with the interposition of at least one transparent plastic film between the first and second reflection holograms.

6. A holographic display element according to claim 3, wherein said transparent plate member is an automobile window glass, said predetermined plane being a horizontal plane and said predetermined range of angles comprising the range from 0 to 40 degrees.

7. A holographic display element attached to a transparent plate member for projecting light rays carrying images of display information onto the display element from a luminous image source positioned on a predetermined first side of the display element, the display element comprising:

a first reflection hologram onto which said light rays are to be projected, the first reflection hologram having such diffraction characteristics that, when collimated external light is incident thereon from a second side opposite to said first side and diffracted, light in the visible region of wavelengths is diffracted into a predetermined range of angles in a predetermined plane; and a second reflection hologram which is superposed on said first reflection hologram on said second side, the second reflection hologram being different from said first reflection hologram in diffraction characteristics such that, when collimated external light is incident on the display element from said second side under such conditions that said first reflection hologram diffracts the external light as visible light into said predetermined range of angles, the second reflection hologram diffracts visible light of different wavelengths into said predetermined range of angles so as to reduce excitation purity of color appearing in said predetermined range of angles by additive color mixing of light diffracted by the first and second reflection holograms.

8. A holographic display element according to claim 7, wherein said different wavelengths of light diffracted into said predetermined range of angles by said second reflection hologram are complementary to the wavelengths of light diffracted into said predetermined range of angles by said first reflection hologram, wherein said additive color mixing results in whitening of the mixture of light.

9. A holographic display element according to claim 7, wherein said transparent plate member is an automobile windshield, said predetermined plane being a horizontal plane and said predetermined range of angles being 0 to 40 degrees.

10. A holographic display element according to claim 7, wherein said second reflection hologram is placed directly on said first reflection hologram.

11. A holographic display element according to claim 7, wherein said second reflection hologram is superposed on said first reflection hologram with the interposition of at least one transparent plastic film between the first and second reflection holograms.

12. A holographic display element attached to a transparent plate member for projecting light rays carrying images of display information onto the display element from a luminous image source positioned on a predetermined first side of the display element, the display element comprising:

a reflection hologram sheet which comprises a transparent substrate, a record layer on one side of said substrate, first and second patterns of interference fringes formed in said record layer by a multiple exposure process so as to serve as first and second reflection holograms, respectively, the first reflection hologram having such diffraction characteristics that, when collimated external light is incident thereon from a second side opposite to said first side and diffracted, visible light of wavelengths in the range from about 570 nm to about 780 nm is diffracted into a predetermined range of angles in a predetermined plane, the second reflection hologram being different from the first reflection hologram in diffraction characteristics such that, when collimated external light is incident on the display element from said second side under such conditions that the first reflection hologram diffracts the external light as visible light of wavelengths in the range from about 570 nm to about 780 nm into said predetermined range of angles, the second reflection hologram diffracts visible light of different wavelengths into said predetermined range of angles so as to reduce excitation purity of color appearing in said predetermined range of angles by additive color mixing of light diffracted by the first and second reflection holograms.

13. A holographic display element according to claim 12, wherein said different wavelengths of light diffracted into said predetermined range of angles by said second reflection hologram are complementary to the wavelengths of light diffracted into said predetermined range of angles by said first reflection hologram, resulting in said additive color mixing whitening the mixture of light.

14. A holographic display element according to claim 12, wherein said transparent plate member is an automobile windshield, said predetermined plane being a horizontal plane and said predetermined range of angles comprising the range from 0 to 40 degrees.

* * * * *

UNITED STATES PATENT AND TRADEMARK OFFICE
CERTIFICATE OF CORRECTION

PATENT NO. : 5,153,751

DATED : October 6, 1992

INVENTOR(S) : Tomohisa ISHIKAWA et al.

It is certified that error appears in the above-identified patent and that said Letters Patent is hereby corrected as shown below:

On title page, item [75] the names of the Inventors should appear as follows:

--[75] Inventors:    Tsuyoshi Todoriki, Yokosuka; Tomohisa Ishikawa and Yoshinori Akamatsu, both of Matsusaka, all of Japan--

Signed and Sealed this

Twenty-second Day of March, 1994

*Attest:*

BRUCE LEHMAN

*Attesting Officer*     *Commissioner of Patents and Trademarks*